United States Patent [19]

Rabii

[11] Patent Number: 5,361,101
[45] Date of Patent: Nov. 1, 1994

[54] PREAMPLIFIER FOR MULTIMEDIA DISPLAY

[75] Inventor: Khosro M. Rabii, Arlington Heights, Ill.

[73] Assignee: Zenith Electronics Corporation, Glenview, Ill.

[21] Appl. No.: 155,983

[22] Filed: Nov. 19, 1993

[51] Int. Cl.[5] .................. H04N 9/76; H04N 9/74; H04N 5/57; H04N 5/265

[52] U.S. Cl. .................. 348/599; 348/598; 348/588; 348/586; 348/584; 348/673; 348/679; 348/682; 348/689; 348/692; 348/694; 348/683; 348/904

[58] Field of Search ................ 348/598–600; 348/584, 588, 586, 589, 590, 578, 585, 591–597, 564–566, 673, 677–679, 675, 682, 683, 687, 689, 691, 692, 694, 722, 645, 647, 648, 656, 657, 904, 684; H04N 5/262, 5/272, 5/265, 5/45, 5/52, 5/57, 9/76, 9/74, 9/72

[56] References Cited

U.S. PATENT DOCUMENTS

| | | | |
|---|---|---|---|
| 4,660,084 | 4/1987 | Filliman et al. | 348/687 X |
| 4,660,085 | 4/1987 | Harwood et al. | 348/694 |
| 4,713,695 | 12/1987 | Macheboeuf | 348/678 X |
| 4,855,812 | 8/1989 | Rokuda et al. | 348/566 |
| 4,947,253 | 8/1990 | Neal | 348/578 X |
| 4,965,669 | 10/1990 | Canfield et al. | 348/588 X |
| 5,032,917 | 7/1991 | Aschwanden | 348/904 X |
| 5,170,252 | 12/1992 | Gear et al. | 348/659 |

Primary Examiner—James J. Groody
Assistant Examiner—Safet Metjahic

[57] ABSTRACT

An RGB preamplifier for a video display includes respective multipliers independently operable for adjusting the contrast of input primary and secondary video signals. The contrast adjusted video signals are added to form a combined display signal, the combined signal being applied to the first inputs of primary and secondary comparators each of which is also supplied with a respective reference DC level. The primary and secondary video signals are alternately nulled at horizontal line rate by nulling the corresponding multipliers. The primary comparator samples the combined signal when the secondary signal is nulled for clamping the DC level of the primary signal in relation to the primary reference DC level and the secondary comparator samples the combined signal when the primary signal is nulled for clamping the DC level of the secondary signal in relation to the secondary reference DC level.

10 Claims, 2 Drawing Sheets

PREAMPLIFIER FOR MULTIMEDIA DISPLAY

BACKGROUND OF THE INVENTION AND PRIOR ART

This invention relates generally to multimedia RGB signal processors and specifically to a multimedia RGB preamplifier capable of processing very high frequency analog signals.

Recent developments in video display systems, such as those used in television receivers and monitors, have included elaborate systems for overlaying one video signal upon another, mixing video signals and in picture-in-picture systems, replacing a portion of a video signal with another video signal or an alphanumeric character display. The range of display variations is vast. In a television studio environment, sophisticated and expensive equipment is required to provide such multimedia visual presentations. Such equipment, even though expensive, is limited in terms of its frequency handling capability since it generally uses digital processing. In the proposed HDTV (high definition television) broadcasting systems, the bandwidth of the video signal will be on the order of 35 to 40 MHz rather than the 4 to 5 MHz used in the present NTSC system. Since digital processing requires converters and the like to operate at a minimum of twice the highest frequency to be processed, there will be a need for other than digital processing to generate multimedia displays.

The present invention includes circuitry for overlaying one video signal (the secondary signal) on another video signal (the primary signal). Both the brightness and contrast of each of the primary and secondary signals are independently adjustable and the mixing ratio of the two signals is variable to allow for the provision of various special effects, such as gradually blending the graphics overlay into and out of the main video image.

OBJECTS OF THE INVENTION

A principal object of the invention is to provide a novel method of producing multimedia displays.

Another object of the invention is to provide a preamplifier for a multimedia display system for processing analog RGB signals of extremely high frequency.

A further object of the invention is to provide a novel mixing arrangement for a pair of high frequency analog RGB signals.

BRIEF DESCRIPTION OF THE DRAWINGS

These and other objects and advantages of the invention will become apparent upon reading the following description in conjunction with the drawings, in which.

DESCRIPTION OF THE PREFERRED EMBODIMENT

Figure 1:
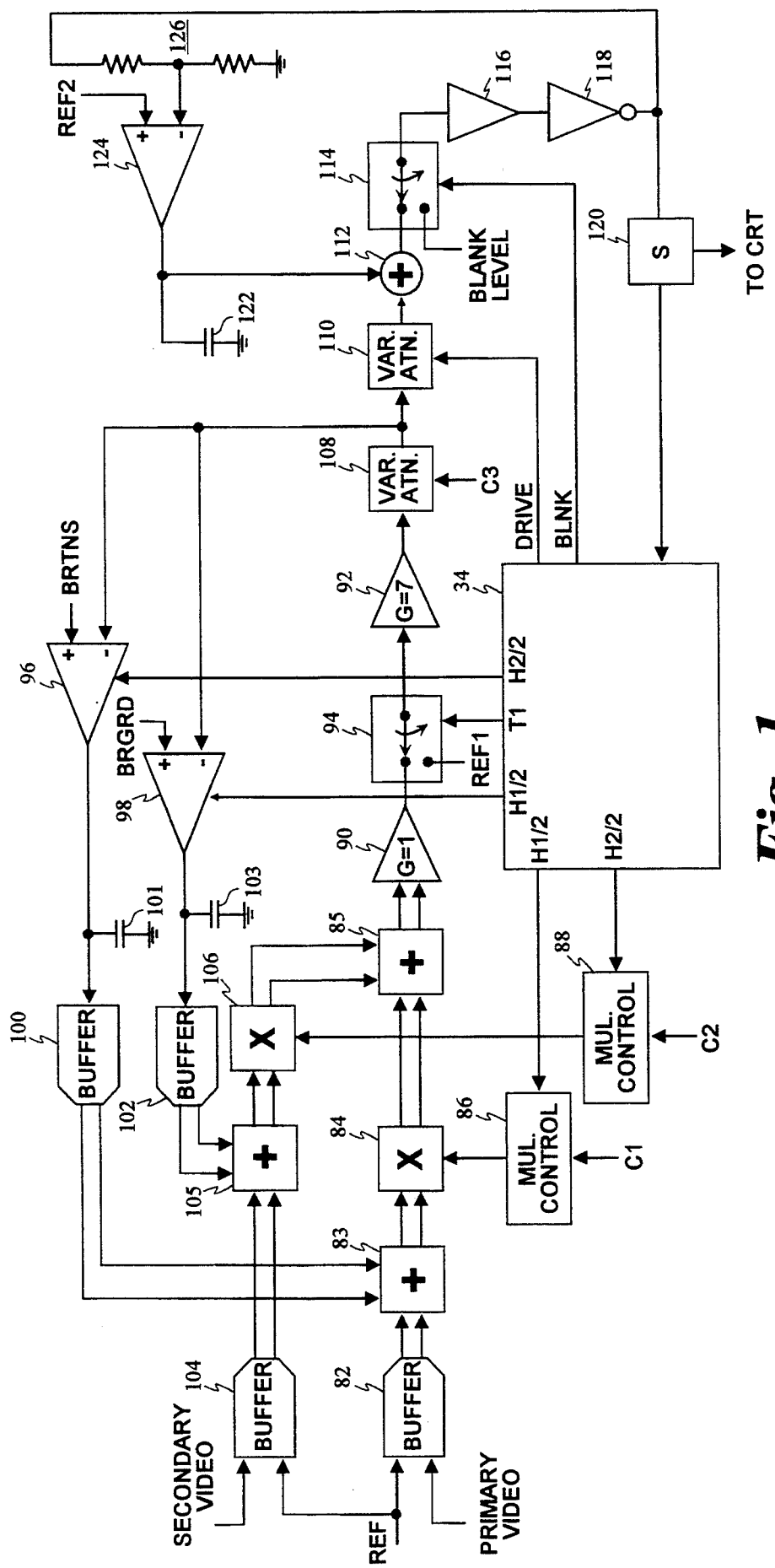
FIG. 1 is a block diagram of an RGB preamplifier according to the invention.

Referring to FIG. 1, a simplified block diagram of a representative preamplifier constructed according to the invention is illustrated. It will be appreciated that one such circuit is used for each of the R, G and B color signals in a typical video display. Assuming that the preamplifier is intended for processing R color video signals, a primary R input video signal is applied to one input of a buffer amplifier 82, the other input being supplied with a reference voltage. A secondary R input video signal is supplied to a buffer 104 which has its other input supplied with the same reference. Thus, both the primary and the secondary R input signals are referenced to a common potential. Buffer 82 has a differential output that is applied to one input of an adder 83. The output of adder 83 is supplied to a multiplier 84, the multiplication ratio of which is controlled by a multiplier control circuit 86 in response to an adjustable primary control signal C1. The differential output of multiplier 84 is applied to one input of another adder 85, the output of which is supplied to the inputs of a unity gain amplifier 90.

The secondary R input signal is supplied by buffer 104 to one input of an adder 105. The output of adder 105 is applied to a multiplier 106, whose output is applied to the second input of adder 85 which thereby combines the input primary and secondary video signals and supplies the combined signal to amplifier 90. The output of amplifier 90 (the combined primary and secondary signals) is supplied through a boost amplifier 92 to a variable attenuator 108 which is controlled by an adjustable contrast control signal C3.

Adder 83 receives a second input from a buffer 100 that has its input coupled to a clamping capacitor 101 and to the output of a primary signal comparator 96 that has an adjustable reference brightness input signal BRTNS. Similarly, the second input to adder 105 is supplied by a buffer 102 which has its input coupled to a clamping capacitor 103 and to the output of a secondary signal comparator 98 that has an adjustable reference brightness input signal BKGRD. The other inputs of comparators 96 and 98 are supplied with the combined signal developed at the output of adder 85 and coupled to the comparators by amplifiers 90 and 92 and attenuator 108.

Figure 2:
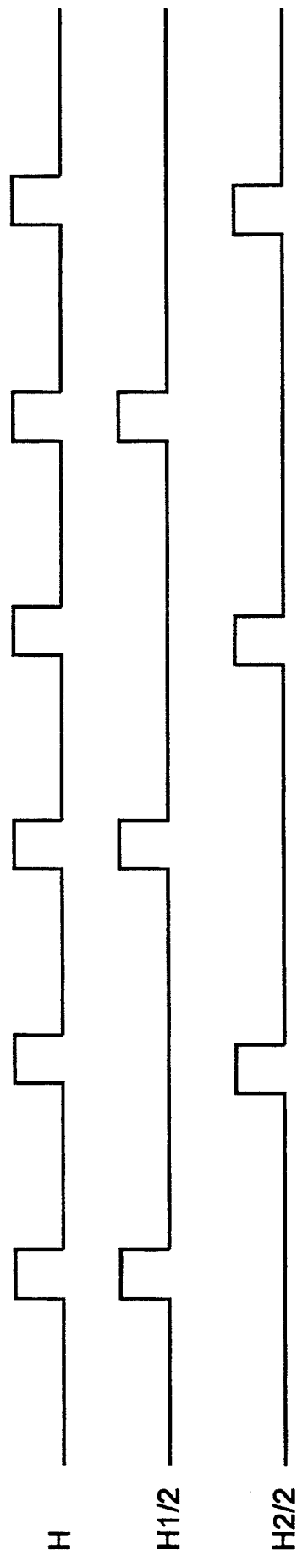
FIG. 2 illustrates a series of waveforms used in controlling the preamplifier of FIG. 1.

Referring now to FIG. 2, a timing circuit 34 is responsive to a line or horizontal rate signal H for generating a pair of 180 degree displaced timing signals H1/2 and H2/2, both occurring at one-half the horizontal rate. Timing signal H1/2 is applied as a null control input to multiplier control circuit 86 and as a sample input to secondary signal comparator 98. Similarly, timing signal H2/2 is applied as a null control input to multiplier control circuit 88 and as a sample input to primary comparator 96.

Figure 3:
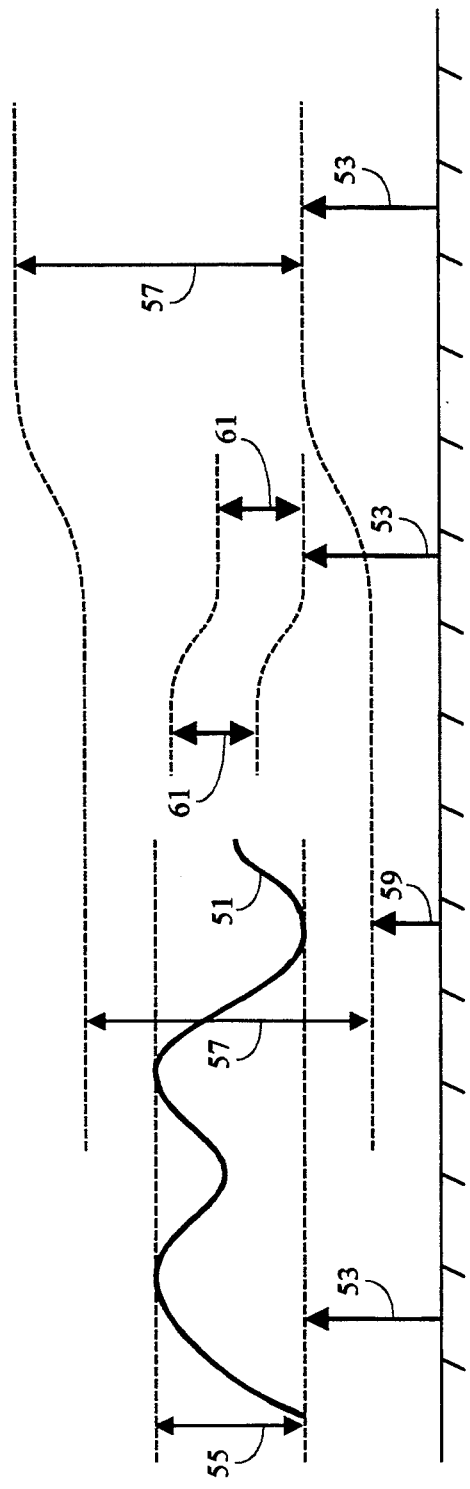
FIG. 3 illustrates how the DC level and contrast of an input signal are controlled by the preamplifier of FIG. 1

In operation, adjustment of the brightness reference signal BRTNS sets the brightness level of the primary video signal and adjustment of signal C1 sets the contrast of the primary video signal. Likewise, adjustment of reference signal BKGRD and signal C2 set the brightness and contrast respectively of the secondary signal. As used herein, brightness refers to the DC level of a signal while contrast refers to the dynamic range of the signal. Thus, referring to FIG. 3, the brightness of an exemplary video signal 51 is represented by DC level 53 and its contrast by dynamic range 55. It will be understood that exemplary signal 51 may represent either an input primary or secondary video signal.

Assuming that signal 51 represents a primary input video signal, suppose that control signal C1 is adjusted to increase the contrast of the primary signal from 55 to 57, thereby temporarily reducing its DC level from 53 to 59. During each horizontal interval (preferably during the back porch thereof) corresponding to a pulse of timing signal H2/2, multiplier control circuit 88 is operated to couple a null control signal to multiplier 106. Also an H2/2 sample pulse is supplied to primary comparator 96. As a result, during each H2/2 pulse the output of multiplier 106 is nulled (i.e. equal to zero) so that the output of adder 85 comprises only the primary input video signal whose DC or brightness level 59 is compared to the reference level BRTNS by comparator 96. Since level 59 is below the reference (i.e. level 53), comparator 96 generates an output for charging capacitor 101 to increase the DC level supplied to the second input of adder 83. The DC level of the primary signal is thereby increased, this process being repeated in response to successive pulses H2/2 until the brightness level of the increased contrast primary signal is restored to the reference level 53 shown in FIG. 3. A similar operation is effected when the contrast is reduced except that the capacitor 101 is discharged to reduce the DC level of the primary video signal until the reference DC brightness level 53 is established (see reduced contrast ratio signal 61).

The circuit operates in a similar manner when the contrast of the secondary video signal is adjusted, except that its DC level is referenced to the BKGRD signal and signal H1/2 is used to control circuit 86 for hulling multiplier 84 while comparator 98 samples the combined signal, which at this time consists only of the secondary video signal. In this way, the contrast of each of the primary and secondary input video signals may be independently adjusted, while they remain clamped to respective DC brightness (or background) levels. Also, the secondary signal can be conveniently blended into and out of the primary image by appropriate adjustment of control signal C2. Other special effects are likewise possible by appropriate adjustment of control signals C1 and C2. The DC reference levels BRTNS and BKGRD can, of course, also be adjusted to increase or decrease the DC level or offset of the respective signals.

Referring back to FIG. 1, a switch 94, which is preferably implemented as a current switching device, is inter-posed between amplifier 90 and amplifier 92. Switch 94 normally passes the combined signal from adder 85 to variable attenuator 108. Attenuator 108, which is operable for adjusting the contrast of the combined video signal, supplies an output to another variable attenuator 110 which is controlled by a signal DRIVE from signal processor and timing circuit 34. The output of attenuator 110 is applied through a summer 112 and a second switch 114 to the input of a low-level amplifier 116. The output of amplifier 116 is amplified by a high voltage driver 118 for application to the CRT.

Switch 94 is responsive to a timing signal T1 coinciding with the first two or three overscan lines during each vertical blanking interval for injecting a reference level signal REF1 at the input of amplifier 92. The cathode current generated by high voltage driver 118 in response to signal REF1 is sampled by a sampling circuit 120 and applied as a feedback voltage to signal processor and timing circuit 34, which compares the sampled voltage to a reference voltage related to REF1. Signal DRIVE is generated in response to this comparison for controlling variable attenuator 110 to appropriately adjust the level of the video signal when switch 94 is in its normal position.

Switch 114 is responsive to a timing signal BLNK from timing circuit 34 for injecting an appropriate blanking level to the input of amplifier 116 during all horizontal and vertical blanking intervals. Finally, a second input of summer 112 is supplied by a clamping capacitor 122 connected to the output of a comparator 124 and its third input is supplied with a control signal BIAS. Control signal BIAS is selected for equalizing the DC operating characteristics of the R, G and B CRT's, while comparator 124 controls the voltage across capacitor 122 as a function of the difference between a voltage developed by a voltage divider 126 connected to the output of high voltage driver 118 and a reference voltage REF2 to facilitate cold start-up of the display.

In summary, with the arrangement, two high frequency analog RGB input signals are used to develop a single display signal for the CRTs. The display signal may comprise either primary or secondary or mixed primary and secondary in the proportion desired under control of a microprocessor which, in turn, is controllable by the user. Other uses and advantages of the invention will be apparent to those skilled in the art without departing from its true spirit and scope. The invention is to be limited only as defined in the claims.

What is claimed is:

1. A method of adjusting primary and secondary video signals comprising:
    establishing respective first and second DC reference signals for said primary and secondary video signals;
    combining said primary and secondary video signals to form a combined signal;
    alternately nulling one of said primary and secondary video signals while comparing said combined signal with the one of said first and second reference signals associated with the other of said primary and secondary video signals; and
    adjusting the DC level of said other of said primary and secondary video signals in response to said comparing step.

2. The method of claim 1 including independently adjusting the dynamic range of each of said primary and secondary video signals, wherein said hulling step is effected by adjusting the dynamic range of the respective one of said video signals to a substantially zero value.

3. The method of claim 1 wherein said step of alternately nulling is performed at a rate corresponding to the horizontal scanning frequency characterizing said primary and secondary video signals.

4. The method of claim 1 including adjusting said first and second DC reference signals.

5. A circuit for adjusting primary and secondary video signals comprising:
    first and second multipliers independently operable for adjusting the contrast of said primary and secondary video signals respectively;
    means for combining the outputs of said first and second multipliers to form a combined video signal;
    first and second comparators operable for comparing the combined signal with respective first and second DC reference levels;
    control means for generating a plurality of alternating first and second timing signals, each of said first timing signals being applied for operating said second multiplier for hulling said secondary video signal and to said first comparator for enabling comparison of the combined video signal with said first DC reference level and each of the second timing signals being applied for operating said first multiplier for hulling said primary video signal and to said second comparator for enabling comparison of the combined video signal with said second DC reference level; and means responsive to said first and second comparators for adjusting the DC levels of said primary and secondary video signals respectively.

6. The circuit of claim 5 wherein said means for adjusting comprises a first clamping circuit responsive to said first comparator for clamping said primary video signal to said first DC reference level and a second clamping circuit responsive to said second comparator for clamping said secondary video signal to said second DC reference level.

7. The circuit of claim 5 wherein said control means comprises a timing circuit for generating said plurality of alternating first and second timing signal at a rate corresponding to the horizontal scanning rate of said primary and secondary video signals.

8. The circuit of claim 6 wherein each of said clamping circuits comprises a device for accumulating a correction signal in response to the output of its respective comparator and means for adding the correction signal to the primary or secondary video signal.

9. A circuit for adjusting primary and secondary video signals comprising:

first and second multipliers independently operable for adjusting the contrast of said primary and secondary video signals respectively;

means for combining the outputs of said first and second multipliers to form a combined video signal;

first and second comparators operable for comparing the combined signal with respective first and second DC reference levels;

a timing circuit for generating a plurality of alternating first and second timing signals at a rate corresponding to the horizontal scanning rate of said primary and secondary video signals, each of said first timing signals being applied for operating said second multiplier for hulling said secondary video signal and to said first comparator for enabling comparison of the combined video signal with said first DC reference level and each of the second timing signals being applied for operating said first multiplier for nulling said primary video signal and to said second comparator for enabling comparison of the combined video signal with said second DC reference level;

a first clamping circuit responsive to said first comparator for clamping said primary video signal to said first DC reference level; and a second clamping circuit responsive to said second comparator for clamping said secondary video signal to said second DC reference level.

10. The circuit of claim 9 wherein each of said clamping circuits comprises a device for accumulating a correction signal in response to the output of its respective comparator and means for adding the correction signal to the primary or secondary video signal.

* * * * *